(12) United States Patent
Rothaar et al.

(10) Patent No.: US 10,128,931 B2
(45) Date of Patent: Nov. 13, 2018

(54) ANTENNA COMBINER

(71) Applicant: Kymeta Corporation, Redmond, WA (US)

(72) Inventors: Bruce Rothaar, Woodinville, WA (US); Shawn Preston, Redmond, WA (US); Nathan Bialke, Redmond, WA (US)

(73) Assignee: KYMETA CORPORATION, Redmond, WA (US)

( * ) Notice: Subject to any disclaimer, the term of this patent is extended or adjusted under 35 U.S.C. 154(b) by 0 days.

(21) Appl. No.: 15/652,054

(22) Filed: Jul. 17, 2017

(65) Prior Publication Data

US 2018/0026702 A1   Jan. 25, 2018

Related U.S. Application Data

(60) Provisional application No. 62/364,694, filed on Jul. 20, 2016.

(51) Int. Cl.
*H04B 7/02*   (2018.01)
*H04B 7/185*  (2006.01)
(Continued)

(52) U.S. Cl.
CPC ......... *H04B 7/0857* (2013.01); *H04B 7/0604* (2013.01); *H04B 7/0608* (2013.01);
(Continued)

(58) Field of Classification Search
CPC ............................ H04B 7/0602–7/0695; H04B 7/0802–7/0897; H04B 7/18502–7/18597
See application file for complete search history.

(56) References Cited

U.S. PATENT DOCUMENTS

| 6,118,773 | A  | * | 9/2000 | Todd    | H04B 7/0808 |
|           |    |   |        |         | 370/334     |
| 6,546,259 | B1 | * | 4/2003 | Vendryes| H04B 7/0608 |
|           |    |   |        |         | 455/428     |

(Continued)

FOREIGN PATENT DOCUMENTS

EP        0540124        5/1993

OTHER PUBLICATIONS

PCT Application No. PCT/US2017/043150, Notification of Transmittal of the International Search Report and the Written Opinion, dated Nov. 2, 2017, 12 pgs.

*Primary Examiner* — Duc M Nguyen
(74) *Attorney, Agent, or Firm* — Womble Bond Dickinson (US) LLP

(57) ABSTRACT

An antenna combiner with transmission arbitration and method for using the same are described. In one embodiment, the apparatus comprises a plurality of antennas to receive signals from a satellite, each antenna in the plurality of antennas having a transmit aperture and a receive aperture, and wherein the receive aperture is operable to receive one of the signals from the satellite; a plurality of signal analyzers coupled to the plurality of antennas, each signal analyzer operable to determine signal quality of a distinct one antenna of the plurality of antennas; an arbiter coupled to the plurality of signal analyzers and operable to select one antenna of the plurality of antennas to transmit to the satellite based on results of determining the signal quality; and a first selector coupled to the arbiter and the plurality of antennas to cause data to be sent to the one antenna selected for transmission to the satellite.

24 Claims, 15 Drawing Sheets

(51) Int. Cl.
   *H04B 7/08*   (2006.01)
   *H04B 7/06*   (2006.01)
(52) U.S. Cl.
   CPC ............ *H04B 7/084* (2013.01); *H04B 7/0814* (2013.01); *H04B 7/0868* (2013.01); *H04B 7/1851* (2013.01)

(56) References Cited

U.S. PATENT DOCUMENTS

| | | | |
|---|---|---|---|
| 7,233,297 B1 | 6/2007 | Harvey et al. | |
| 9,705,634 B2* | 7/2017 | Lim | H04L 67/20 |
| 2002/0132600 A1* | 9/2002 | Rudrapatna | H01Q 1/246 455/277.1 |
| 2004/0203347 A1* | 10/2004 | Nguyen | H04B 7/0691 455/13.3 |
| 2005/0179607 A1 | 8/2005 | Gorsuch | |
| 2006/0046639 A1* | 3/2006 | Walker | H04B 7/18519 455/3.02 |
| 2006/0111056 A1* | 5/2006 | Dutta | H01Q 3/24 455/103 |
| 2008/0152030 A1* | 6/2008 | Abramov | H04B 7/0617 375/260 |
| 2008/0204326 A1 | 8/2008 | Zeinolabedin Rafi et al. | |
| 2008/0219234 A1* | 9/2008 | Bolgiano | G01S 5/14 370/342 |
| 2009/0257487 A1* | 10/2009 | Wang | H04B 7/0617 375/240.02 |
| 2012/0302183 A1* | 11/2012 | Pescod | H01Q 1/273 455/78 |
| 2013/0178200 A1* | 7/2013 | Shiu | H04B 7/0613 455/418 |
| 2013/0321201 A1* | 12/2013 | Savoy | G01S 19/15 342/357.3 |
| 2014/0206414 A1* | 7/2014 | Oh | H04B 7/0404 455/562.1 |
| 2014/0250469 A1* | 9/2014 | Locatori | H04B 7/18595 725/68 |
| 2015/0160350 A1 | 6/2015 | Waters et al. | |
| 2016/0226136 A1* | 8/2016 | Paleta, Jr. | H01Q 1/42 |
| 2016/0233588 A1* | 8/2016 | Bily | H01Q 25/00 |
| 2016/0373181 A1* | 12/2016 | Black | H04B 7/0695 |
| 2017/0358851 A1* | 12/2017 | Diamond | H01Q 1/28 |

* cited by examiner

ANTENNA COMBINER

PRIORITY

The present patent application claims priority to and incorporates by reference the corresponding provisional patent application Ser. No. 62/364,694, titled, "Antenna Combiner" filed on Jul. 20, 2016.

FIELD OF THE INVENTION

Embodiments of the present invention relate to the field of satellite communication; more particularly, embodiments of the present invention relate to radio frequency (RF) combining and transmit arbitration.

BACKGROUND OF THE INVENTION

When using electrically-steerable flat-panel antennas for satellite communications, there is often a need to provide communications links with performance that cannot be achieved with a single aperture. This may often be the case when there is a weak signal from the satellite. When this occurs, an antenna trying to receive the signal from the satellite may not have a signal-to-noise ratio (SNR) that is sufficient enough for the antenna to achieve a lock onto the satellite signal. A ground terminal's ability to receive high bit rates depends on that terminal's ability to have a high gain-to-noise temperature (G/T) antenna.

Radio frequency (RF) combining is known in the art. For example, in the area of cellular, RF combining has been used in Multiple Input, Multiple Output (MIMO) deployments. Similarly, RF combining has been used in satellite combiners.

SUMMARY OF THE INVENTION

An antenna combiner with transmission arbitration and method for using the same are described. In one embodiment, the apparatus comprises a plurality of antennas to receive signals from a satellite, each antenna in the plurality of antennas having a transmit aperture and a receive aperture, and wherein the receive aperture is operable to receive one of the signals from the satellite; a plurality of signal analyzers coupled to the plurality of antennas, each signal analyzer operable to determine signal quality of a distinct one antenna of the plurality of antennas; an arbiter coupled to the plurality of signal analyzers and operable to select one antenna of the plurality of antennas to transmit to the satellite based on results of determining the signal quality; and a first selector coupled to the arbiter and the plurality of antennas to cause data to be sent to the one antenna selected for transmission to the satellite.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
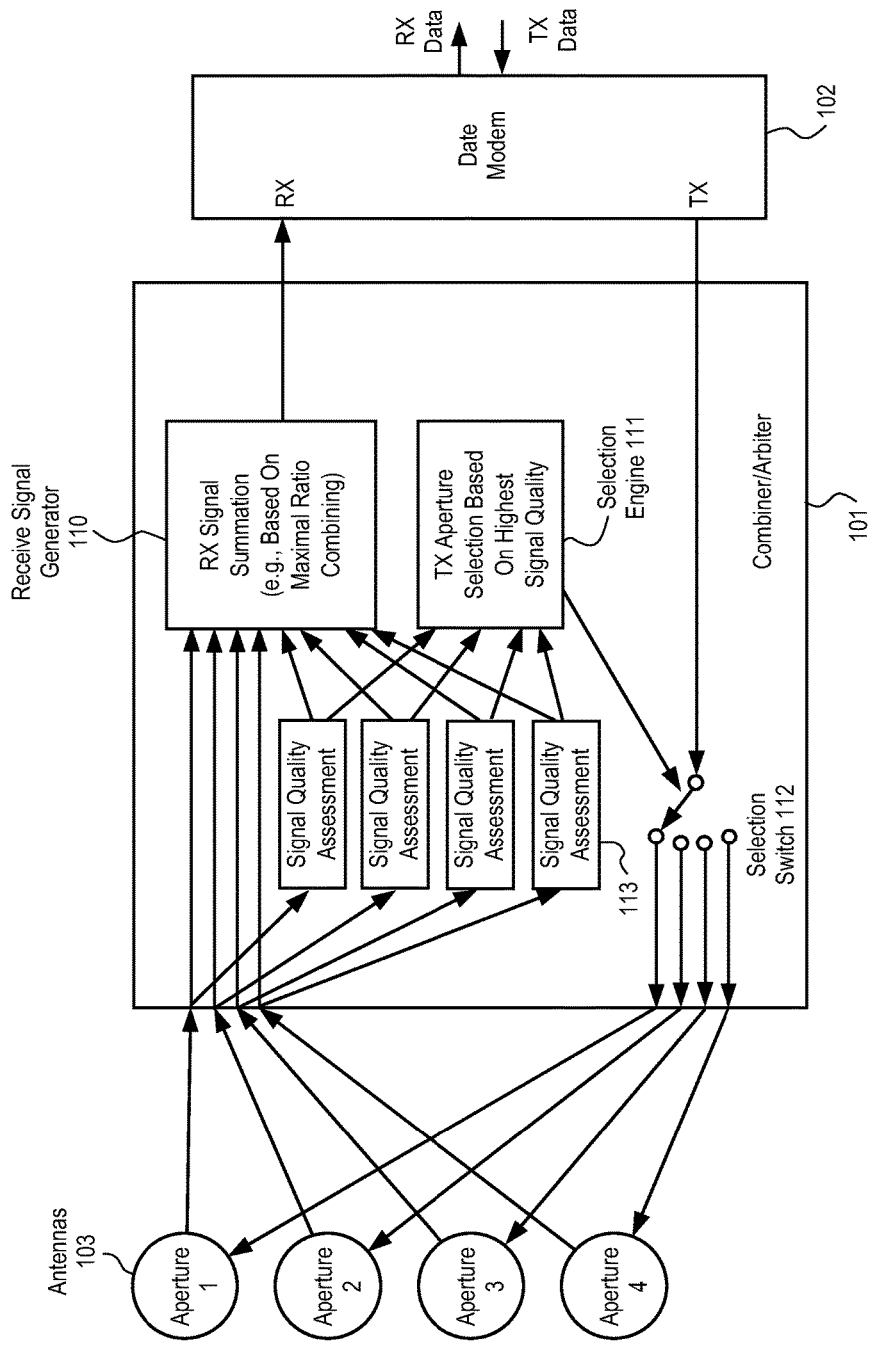
FIG. 1A is a block diagram of one embodiment of a combiner/arbiter in a satellite terminal.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Embodiments of this invention include a system and method for combining the signals from several satellite antennas to achieve higher receive (Rx) link performance than is possible when using only one antenna. Embodiments of the antenna also include techniques to analyze the Rx signal quality from each of the antennas and dynamically select a best antenna for transmitting to that same satellite. This is referred to herein as Rx combining w/transmit (Tx) arbitration.

When using electrically-steerable flat-panel antennas for satellite communications with the techniques described herein, the received (Rx) signal combining provides communications links with performance that cannot be achieved with using a single antenna aperture. A ground terminal's ability to receive high bit rates depends on that terminal's ability to have a high gain-to-noise-temperature (G/T) antenna. A higher G/T antenna can be, in essence, created by electrically combining the signals from 2 (or more) lower G/T antennas by using a combiner. In one embodiment, a high G/T is achieved by summing the Rx signals from all the antennas coherently. In one embodiment, to combine Rx signals coherently, the combiner time aligns the signals and then removes any residual phase differences in a manner well-known in the art. Once the receive signals are coherent, they are added or summed together. In one embodiment, the receive signals are added in a ratio that depends on the quality of the receive signal from each antenna using Maximal Ratio Combining (MRC), which is well-known in the art, or an approximation thereof. Thus, the combining occurs in the digital domain, not the RF domain.

If the combining operation is accomplished to a reasonable degree of accuracy, then the summation produces a 3 dB increase in G/T for each doubling of total antenna area. When the antennas are mounted on a vessel, the motion will be changing the distance and orientation of each of the antennas relative to the satellite continually. Hence, the time alignment function, the phase correction function, and Rx signal quality assessment are very responsive to the constantly changing signals. This is possible because the signal measurements can be made within the combiner itself and the corrections can be made to the signals immediately.

This is not the case when attempting to add transmit signals from several transmit apertures to increase the G/T of the return satellite link. The signals transmitted from a ground terminal cannot be received for hundreds of milliseconds due to the signal path distance from the terminal to the hub that goes through the satellite. A modem at the hub could measure the combined received signal from simultaneous transmitting apertures but wouldn't be able to provide timely instruction back to the terminal on how to change the transmit time-alignment of each aperture so that the combined signal at the hub modem is coherent. Therefore, in one embodiment, only one antenna aperture is used at a time for transmission.

In one embodiment, the transmit (Tx) aperture used for transmission at any given moment is the one antenna that is receiving the best RF signal. In one embodiment, the best Rx signal is known because of continually monitoring signal quality of all the antenna apertures as part of the Maximal Ratio Combining function.

Embodiments of the invention include a combiner system that operates multiple antennas, each of which has a transmit aperture and a receive aperture that produce beam patterns that are directed towards a common satellite, when the combiner performs signal combining functions to enhance the overall G/T of the received signal and uses the knowledge of the quality of each of the Rx signals to select a preferred single aperture for transmission.

FIG. 1A is a block diagram of one embodiment of a combiner/arbiter in a satellite system. Referring to FIG. 1A, combiner/arbiter 101 is coupled to a plurality of antennas 103 and a data modem 102. Although four antennas are shown in FIG. 1A, there may be more or less than four antennas in the satellite system. Each of the antennas 103 (aperture 1-4) receives a signal from the satellite and the received signals are sent to combiner/arbiter 101. In one embodiment, the signals received by each antenna from the satellite are correlated (with noise being uncorrelated) such that bits of the signals received by the antennas are the same. Note that it's possible that one or more antennas are not in the field of view of the satellite, or are otherwise not being used to receive a signal, and thus do not produce a received signal from the satellite at certain periods of time.

In one embodiment, the antennas are electronically-steerable flat panel antennas, and each of the electronically-steerable flat panel antennas includes at least two spatially interleaved antenna arrays combined in a single physical aperture operable independently and simultaneously at distinct frequencies, where those two antenna sub-arrays comprise a tunable slotted array of antenna elements. In one embodiment, at least one of the transmit aperture and the receive aperture operates based on holographic beam forming. Such antennas are described in greater detail below. An example of such an antenna is described in U.S. Patent Publication No. 2016-0233588A1, entitled "Combined Antenna Apertures Allowing Simultaneous Multiple Antenna Functionality," filed Nov. 30, 2015.

The received signals from antennas 103 are sent to receive signal generator 110, which combines the signals into a single received signal. In one embodiment, receive signal generator 110 combines the receive signals by summing the receive signals together. In one embodiment, the receive signals are summed using Maximal Ratio combining, which is well-known in the art, or an approximation thereof. The signals may be combined in other ways, such as, for example, but not limited to equal gain combining, switched combining, and selection combining. The single received signal generated by receive signal generator 110 from the signals received from antennas 103 is sent to data modem 102, which provides it to the rest of the communication system.

The signals received from the antennas 103 are also analyzed by signal analyzers for signal quality. In one embodiment, signal analyzers are shown as signal quality assessment units 113 that are part of combiner/arbiter 101 in FIG. 1A. These signal analyzers generate signal quality information for each of the receive signals and store the signal quality information in a memory. The memory may be part of combiner/arbiter 101 or may be external to, but accessible by, combiner/arbiter 101. Alternatively, the signal quality information is not stored in memory and the signal quality information is used immediately upon reception. In one embodiment, the signal quality information comprises a signal-to-noise ratio (SNR) for each receive signal. In another embodiment, the signal analyzers are not part of combiner/arbiter 101 and are in another part of the satellite system. In such a case, signal quality assessment units 113 are simply storage areas in memory that store the signal quality information and send them to, or make them accessible by, selection engine 111.

Selection engine 111 selects one of antennas 103 to transmit to the satellite. In one embodiment, selection engine 111 signals a selection switch 112 to cause the transmit (Tx) signal from data modem 102 to be sent to the selected antenna for transmission. In one embodiment, selection switch 112 is an RF switch. In one embodiment, selection engine 111 selects the one antenna for transmission based on the signal quality of the signals received from each of antennas 103. This signal quality determination is made by obtaining the signal quality information from signal quality assessment units 113. In one embodiment, selection engine 111 comprises hardware (e.g., circuitry, dedicated logic, etc.), software (such as is run on a general purpose computer system or a dedicated machine), firmware, or a combination of the three.

Note that FIG. 1A does not show specific frequency bands, or up-conversion and down-conversion functions. The concepts are not impacted by the techniques described herein and are the same, independent of whether the functions described herein occur at RF, IF, or baseband.

Figure 1B:
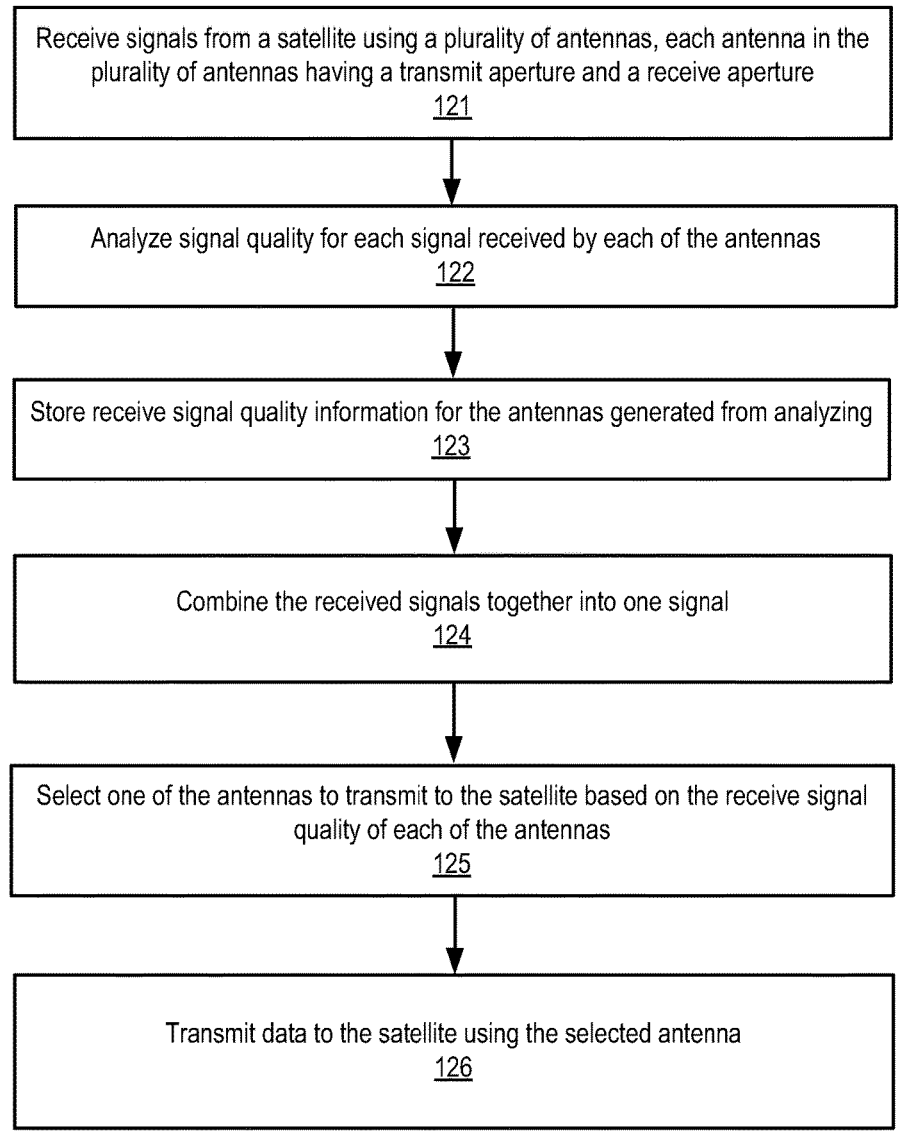
FIG. 1B is a flow diagram of one embodiment of a process for reception combining and transmission arbitration.

FIG. 1B is a flow diagram of one embodiment of a process for reception combining and transmission arbitration. In one embodiment, the processes are performed by processing logic that may comprise hardware (circuitry, dedicated logic, etc.), software (such as is run on a general-purpose computer system or a dedicated machine), firmware, or a combination of the three. In one embodiment, one or more operations in the flow diagram is performed by the combiner/arbiter of FIG. 1A.

Referring to FIG. 1B, the process begins with receiving signals from a satellite using a plurality of antennas, where each of the antennas has a transmit aperture and a receive aperture (processing block 121). In one embodiment, the signals received by each antenna from the satellite are correlated in that the bits of the signals received by the antennas are the same.

As discussed above, in one embodiment, the antennas are electronically-steerable flat panel antennas, and each of the electronically-steerable flat panel antennas includes at least two spatially interleaved antenna arrays combined in a single physical aperture operable independently and simultaneously at distinct frequencies, where those two antenna sub-arrays comprise a tunable slotted array of antenna elements.

For each antenna, processing logic analyzes the signal quality for each received signal (processing block 122). In one embodiment, signal analyzers perform the analysis on each signal. In one embodiment, the signal analyzers measure an error vector between the ideal constellation point and the point received by the receiver, and may include, but are not limited to modulation error, error vector magnitude, carrier-to-noise ratio, and signal-to-noise, which are well-known in the art. These signal analyzers may be part of the combiner/arbiter or may be part of the satellite terminal and provide receive signal quality information as the results of their signal analysis to the combiner/arbiter. In one embodiment, the signal analysis determines the signal-to-noise (SNR) of each of the received signals and that information is made available to the combiner/arbiter. Note that other signal quality metrics may be used instead of the SNR, including, but not limited to, receive signal strength and cross-correlation metric between channels.

After determining the receive signal quality information, processing logic stores the receive signal quality information for the antennas generated from analyzing (processing block 123). The receive signal quality information may be stored in a memory in the satellite terminal that is accessible by the combiner/arbiter. Alternatively, the receive signal quality information is stored in a memory in the combiner/arbiter.

Processing logic combines the received signals together into one signal (processing block 124). In one embodiment, combining the received signals comprises coherently summing the signals. In one embodiment, the received signals are combined using Maximal Ratio combining, or an approximation thereof, in a manner well-known in the art.

Based on the receive signal quality of each of the antennas, processing logic selects one of the antennas to transmit to the satellite of each of the antennas (processing block 125). In one embodiment, the receive signal quality information is accessed from memory and used to select the antenna to transmit. In one embodiment, selecting the one antenna is based on the one antenna having a higher signal quality than other antennas in the plurality of antennas.

After selection, processing logic directs the transmit signal from the data modem to the selected antenna and the selected antenna transmits the data to the satellite (processing block 126).

In one embodiment, if the need exists to transmit at a higher bit rate than one antenna can transmit, the combiner/arbiter selects the transmit aperture of a second antenna to transmit data to the satellite. In such a case, the second antenna would carry additional bits, though the carrier would be placed at a different frequency than the carrier used by the first antenna to transmit. In one embodiment, the selection of the second antenna is based on signal quality information. For example, in one embodiment, the second antenna is selected for transmission because it had the second-best Rx performance (e.g., the second-best SNR).

Figure 2A:
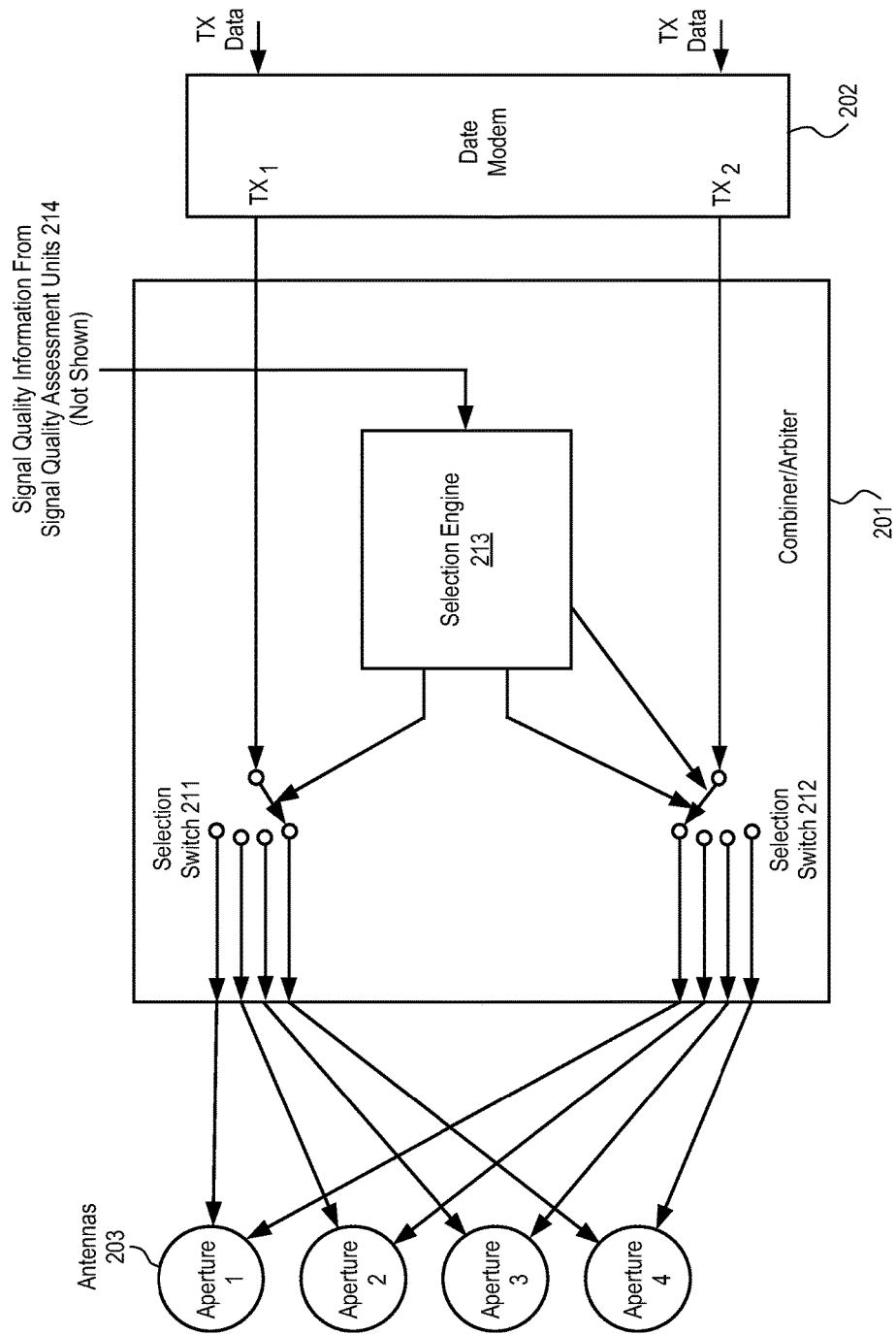
FIG. 2A is a block diagram of one embodiment of a combiner/arbiter in a satellite terminal that selects multiple antennas for transmission.

FIG. 2A is a block diagram of one embodiment of a combiner/arbiter in a satellite terminal that selects multiple antennas for transmission. Referring to FIG. 2A, data modem 202 provides two transmit ($Tx_1$ and $Tx_2$) signals for transmission. The two Tx signals are at different frequencies. $Tx_1$ and $Tx_2$ signals are sent through selection switches 211 and 212, respectively, for transmission using two of antennas 202. In one embodiment, selection switches 211 and 212 are RF switches. Selection switches 211 and 212 are controlled by selection engine 213. That is, in one embodiment, selection engine 213 signals selection switches 211 and 212 to cause the transmit signals $Tx_1$ and $Tx_2$ from data modem 102 to be sent to the selected antennas for transmission.

In one embodiment, selection engine 213 selects two of antennas 203 to transmit to the satellite based on the signal quality of the signals received from each of antennas 103. This determination is made by obtaining the signal quality information from signal quality assessment units 214 (not shown) in the same manner as described above in conjunction with FIGS. 1A and 1B. In one embodiment, selection engine 213 selects the two antennas with the highest receive signal quality (e.g., highest SNRs) to use for transmission. Once selected, the transmit apertures of the selected antennas are used to transmit to the satellite.

In one embodiment, selection engine 213 comprises hardware (e.g., circuitry, dedicated logic, etc.), software (such as is run on a general-purpose computer system or a dedicated machine), firmware, or a combination of the three.

Note that the selection of transmit antennas need not be limited to two antennas. In other embodiments, three or more antennas may be selected for transmission.

Note that combiner/arbiter 201 includes the receive signal combining functionality (not shown), such as described in conjunction with FIG. 1A, but is not shown in FIG. 2A to avoid obscuring the transmission selection functionality.

Figure 2B:
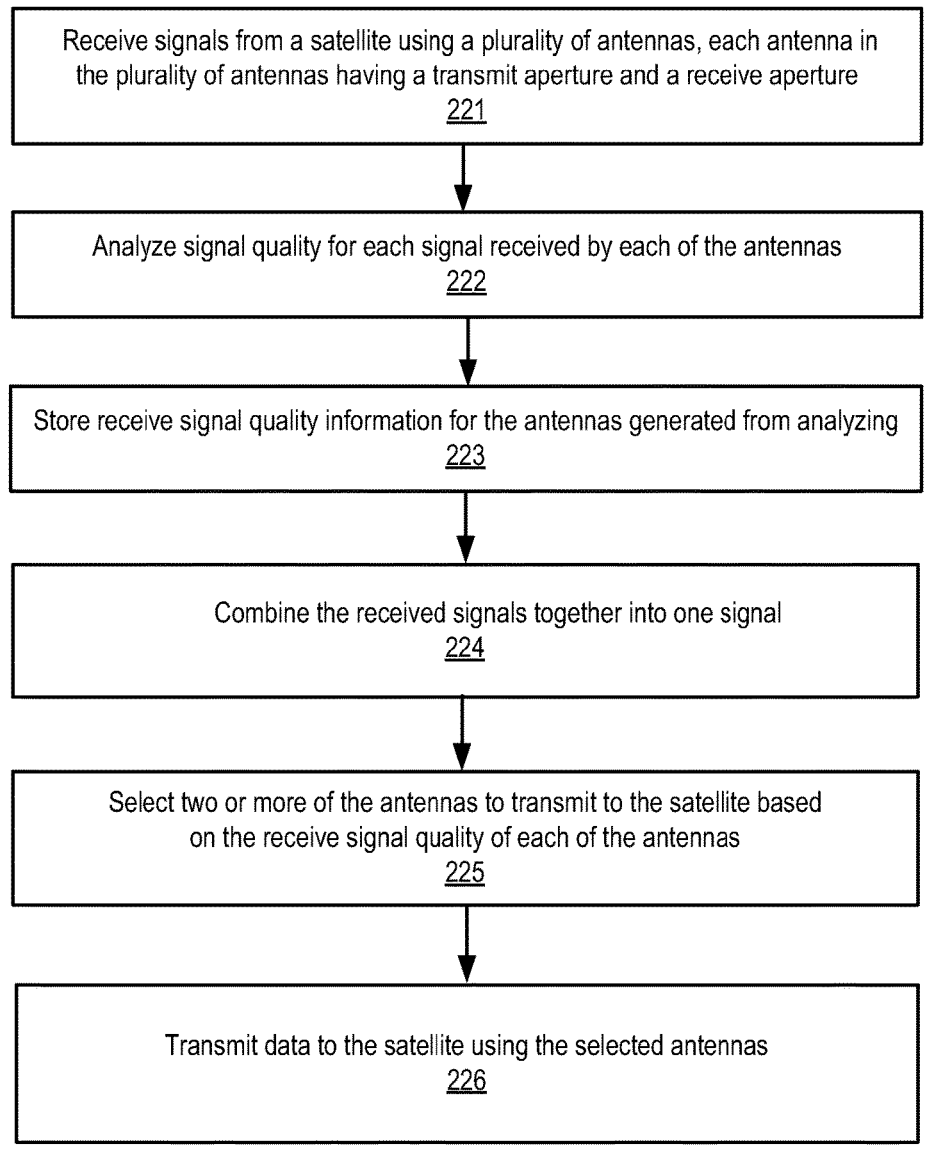
FIG. 2B is a flow diagram of another embodiment of a process for reception combining and transmission arbitration.

FIG. 2B is a flow diagram of another embodiment of a process for reception combining and transmission arbitration. In one embodiment, the processes are performed by processing logic that may comprise hardware (circuitry, dedicated logic, etc.), software (such as is run on a general-purpose computer system or a dedicated machine), firmware, or a combination of the three. In one embodiment, one or more operations in the flow diagram is performed by the combiner/arbiter of FIG. 2A.

Referring to FIG. 2B, the process begins with receiving signals from a satellite using a plurality of antennas, where each of the antennas has a transmit aperture and a receive aperture (processing block 221). In one embodiment, the signals received by each antenna from the satellite are correlated in that the bits of the signals received by the antennas are the same.

In one embodiment, the antennas are electronically-steerable flat panel antennas, and each of the electronically-steerable flat panel antennas includes at least two spatially interleaved antenna arrays combined in a single physical aperture operable independently and simultaneously at distinct frequencies, where those two antenna sub-arrays comprise a tunable slotted array of antenna elements. In one embodiment, at least one of the transmit aperture and the receive aperture operates based on holographic beam forming.

For each antenna, processing logic analyzes the signal quality for each received signal (processing block 222). In one embodiment, signal analyzers perform the analysis on each signal. These signal analyzers may be part of the combiner/arbiter or may be part of the satellite terminal and provide receive signal quality information as the results of the signal analysis to the combiner/arbiter. In one embodiment, the signal analysis determines the signal-to-noise (SNR) of each of the received signals and that information is made available to the combiner/arbiter. Note that other signal quality metrics may be used instead of the SNR.

After determining the receive signal quality information, processing logic stores the receive signal quality information for the antennas generated from analyzing (processing block 223). The receive signal quality information may be stored in memory in the satellite terminal that is accessible by the combiner/arbiter. Alternatively, the receive signal quality information is stored in a memory in the combiner/arbiter.

Processing logic combines the received signals together into one signal (processing block 224). In one embodiment, combining the received signals comprises coherently summing the signals. In one embodiment, the received signals are combined using Maximal Ratio combining, or an approximation thereof, in a manner well-known in the art.

Based on the receive signal quality of each of the antennas, processing logic selects two (or more) of the antennas to transmit to the satellite of each of the antennas (processing block 225). In one embodiment, the receive signal quality information is accessed from memory and used to select the antennas to transmit. In one embodiment, selecting the two (or more) antennas is based on a ranking of the signal quality of each of the antennas, wherein the antennas having the signal quality higher than other antennas are chosen for transmission to the satellite.

After selection, processing logic directs the transmit data from the data modem to the selected antennas and the selected antennas transmit the data to the satellite (processing block 226).

In one embodiment, the selection of one of the antennas for transmit is based on both signal quality and the predicted motion of the antennas. In one embodiment, the antenna is selected for transmission based on highest signal quality and the predicted motion of each of the antennas. The predicted motion may comprise the predicted motion of the platform to which the antennas are attached. More specifically, when one or more apertures are mounted to a moving platform, such as a boat, the inertial measurement units (IMUs) on each of the antenna apertures are able to contribute motion information to the combiner/arbiter, which allows the combiner/arbiter to predict when apertures will move in and out of the field of view of a target satellite (or a pool of target satellites). The prediction information can be used to determine which aperture will be used next for transmit, which can reduce, and potentially minimize, the amount of time required for handoff.

Figure 3A:
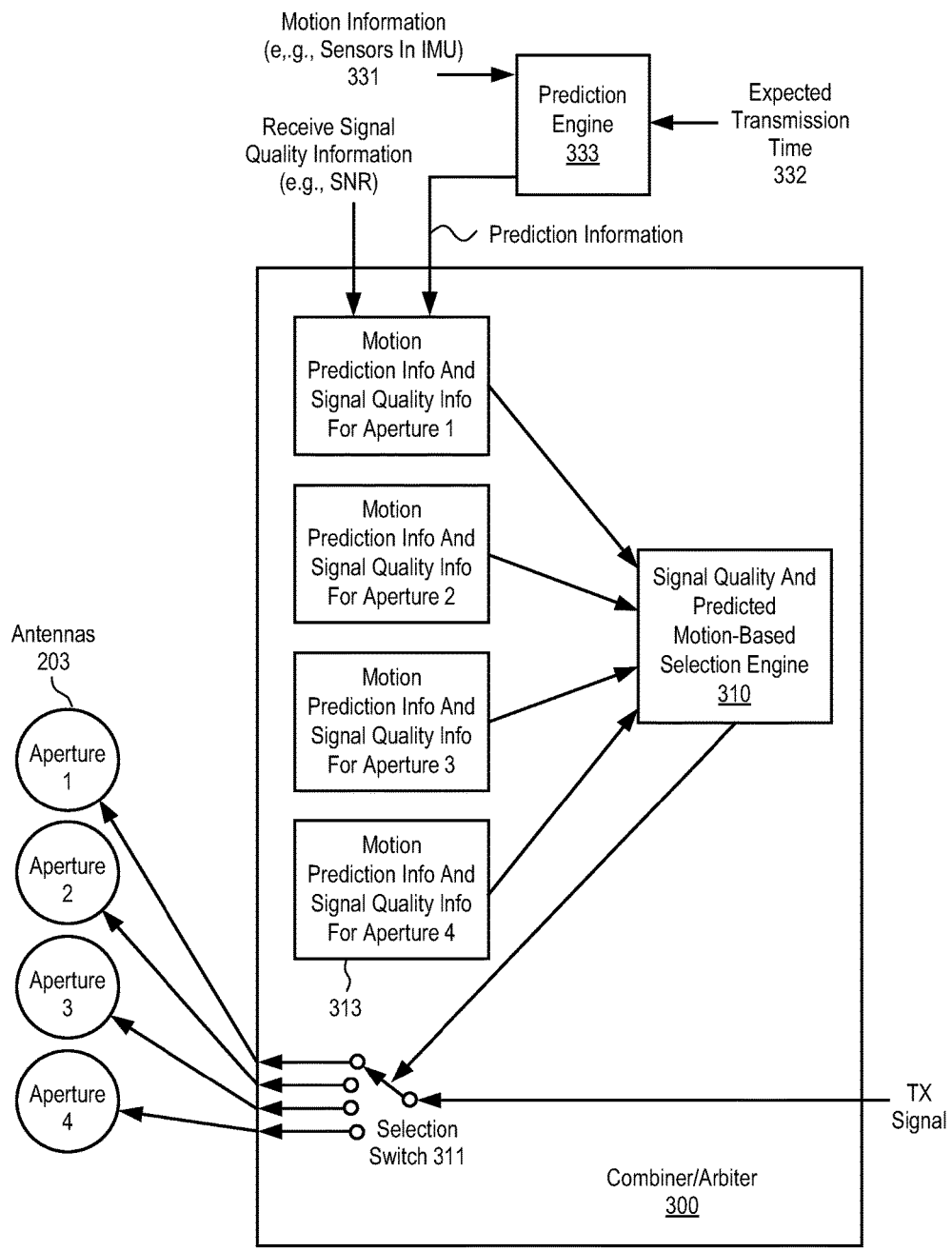
FIG. 3A is a block diagram of one embodiment of a combiner/arbiter in a satellite terminal that selects an antenna for transmission based on signal quality and predicted motion of the antennas.

FIG. 3A is a block diagram of one embodiment of a combiner/arbiter in a satellite terminal that selects an antenna for transmission based on signal quality and predicted motion of the antennas. Referring to FIG. 3A, a transmit signal Tx from a data modem (not shown) is received by combiner/arbiter 300 and provided via selection switch 311 to one of antennas 303. In one embodiment, selection switch 311 is an RF switch. Selection switch 311 is controlled by selection engine 310, which makes the selection based on receive signal quality and predicted motion. The receive signal quality and predicted motion information is stored in memory 313 and provided for each of antennas 303 to or made accessible to selection engine 310. The signal quality information (e.g., SNR information) is generated and provided in the same manner as described above in conjunction with FIG. 1A.

The predicted motion information for each of antennas 303 is provided by prediction engine 333. Prediction engine 333 may be part of combiner/arbiter 300 or may be external to combiner/arbiter 300. In one embodiment, prediction engine 333 generates predicted motion information indicative of the predicted location of each of antennas 303 for the expected time of satellite transmission based on motion information 331 and expected transmission time 332. In one embodiment, the expected transmission time is known because the hub system provides a time slot allocation table to the terminals.

In one embodiment, the motion information is received from sensors in each antenna. In one embodiment, these sensors include one or more of the following: one or more accelerometers, one or more gyroscopes (gyros) (or angular velocity sensors), and one or more magnetometers. These sensors may be part of an inertial measurement unit (IMU). In one embodiment, other position information that is used is longitude and latitude information obtained from a global positioning system (GPS).

By storing the sensor information over time, prediction engine 333 is able to make a prediction as to where each antenna will be located at a time when transmission to the satellite is expected. In one embodiment, the motion prediction information is indicative of the expected position of each of the antennas during the expected transmission time. For example, if a data transmission is to occur within the next 30 milliseconds, prediction engine 333 obtains the historical location information and makes a prediction as to what the location/position of each antenna will be at that time. The amount of historical location information may depend on the prediction algorithm used. For example, in one embodiment, only the last 5 or 10 minutes, or some other short time interval, of historical data is used to make a prediction. In other embodiments, longer time intervals, such as a certain number of hours or days may be used.

In one embodiment, based on the predicted motion information associated with the antennas 303, prediction engine 333 determines if any of antennas 303 will experience an outage to the satellite at the expected transmission time 332. Such an outage occurs when the satellite is not in the field of view of the antenna. Such a determination would be based on the predicted motion information associated with the antennas.

The signal quality information and predicted motion information may be stored in a memory in the satellite terminal that is accessible by combiner/arbiter 300. Alternatively, the signal quality information and predicted motion information is stored in a memory in combiner/arbiter 300.

Using the signal quality information and the predicted motion information, selection engine 310 selects one of antennas 303 to use for transmission to the satellite. In one embodiment, selection engine 310 determines if any of antennas 303 is going to have an outage and eliminates those from selection for transmission, and then selection engine 310 selects one of the remaining antennas for transmission based on a prediction that it will have the best signal quality. This prediction may be provided by prediction engine 333 and stored in the motion prediction information in memory 313.

In one embodiment, selection engine 310 and prediction engine 333 comprise hardware (e.g., circuitry, dedicated logic, etc.), software (such as is run on a general-purpose computer system or a dedicated machine), firmware, or a combination of the three.

Note that combiner/arbiter 300 includes the receive signal combining functionality, such as described in conjunction with FIG. 1A, but this has been removed from FIG. 3A to avoid obscuring the transmission selection functionality.

Figure 3B:
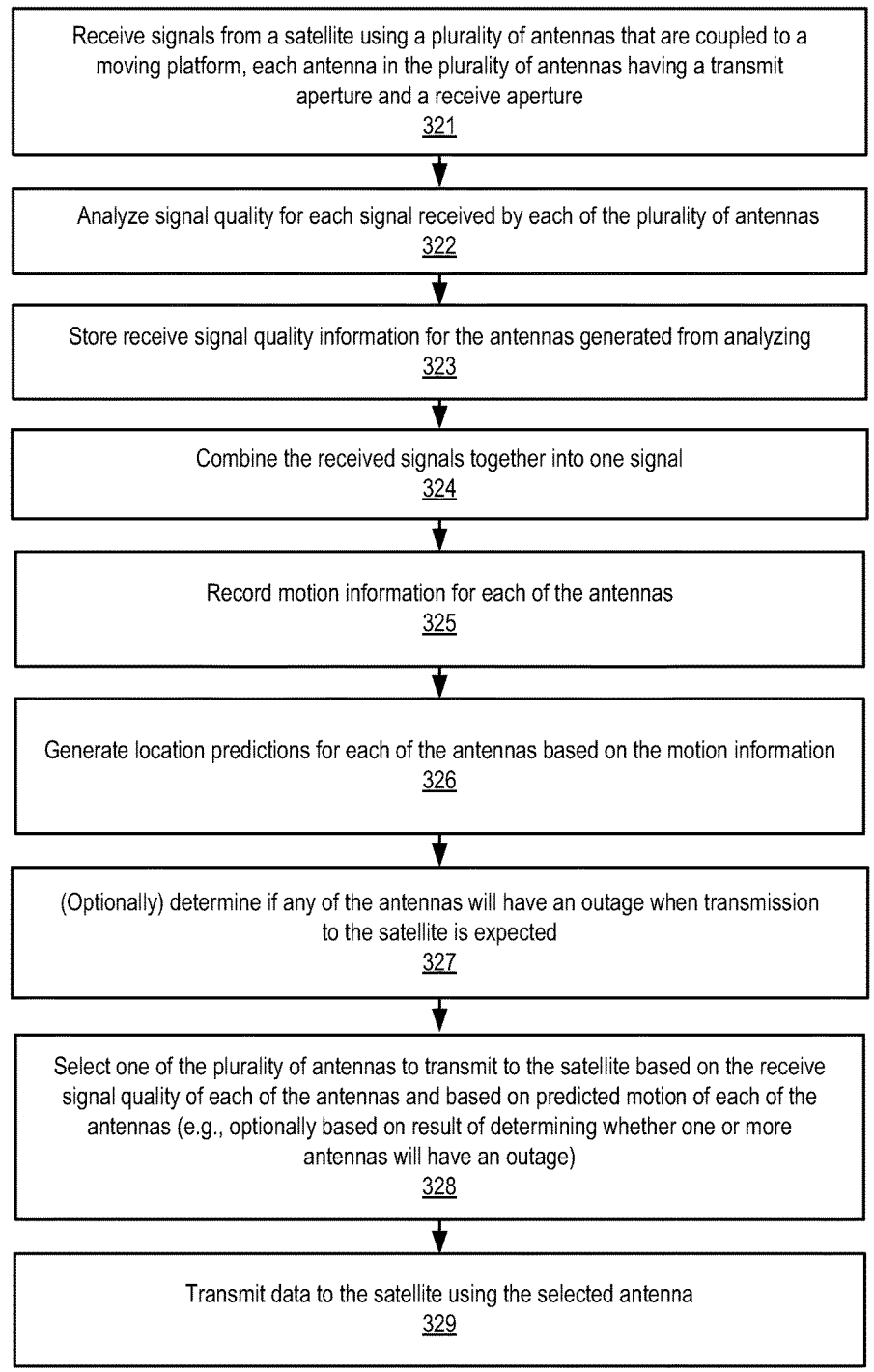
FIG. 3B is a flow diagram of yet another embodiment of a process for reception combining and transmission arbitration.

FIG. 3B is a flow diagram of yet another embodiment of a process for reception combining and transmission arbitration. In one embodiment, the processes are performed by processing logic that may comprise hardware (circuitry, dedicated logic, etc.), software (such as is run on a general-purpose computer system or a dedicated machine), firmware, or a combination of the three. In one embodiment, one or more operations in the flow diagram is performed by the combiner/arbiter of FIG. 3A.

Referring to FIG. 3B, the process begins with receiving signals from a satellite using a plurality of antennas, where each of the antennas has a transmit aperture and a receive aperture (processing block 321). In one embodiment, the signals received by each antenna from the satellite are correlated in that the bits of the signals received by the antennas are the same In one embodiment, the antennas are electronically-steerable flat panel antennas, and each of the electronically-steerable flat panel antennas includes at least two spatially interleaved antenna arrays combined in a single physical aperture operable independently and simultaneously at distinct frequencies, where those two antenna sub-arrays comprise a tunable slotted array of antenna elements. In one embodiment, at least one of the transmit aperture and the receive aperture operates based on holographic beam forming.

For each antenna, processing logic analyzes the signal quality for each received signal (processing block 322). In one embodiment, signal analyzers perform the analysis on each signal. These signal analyzers may be part of the combiner/arbiter or may be part of the satellite terminal and provide receive signal quality information as the results of the signal analysis to the combiner/arbiter. In one embodiment, the signal analysis determines the signal-to-noise (SNR) of each of the received signals and that information is made available to the combiner/arbiter. Note that other signal quality metrics may be used instead of the SNR.

After determining the receive signal quality information, processing logic stores the receive signal quality information for the antennas generated from analyzing (processing block 323). The receive signal quality information may be stored in memory in the satellite terminal that is accessible by the combiner/arbiter. Alternatively, the receive signal quality information is stored in a memory in the combiner/arbiter.

Processing logic combines the received signals together into one signal (processing block 324). In one embodiment, combining the received signals comprises coherently summing the signals. In one embodiment, the received signals are combined using Maximal Ratio combining in a manner well-known in the art.

Also, processing logic records motion information for each of the antennas (processing block 325). In one embodiment, the motion information for each antenna comes from sensors in each antenna. In one embodiment, these sensors include one or more of the following: one or more accelerometers, one or more gyroscopes (gyros) (or angular velocity sensors), and one or more magnetometers. These sensors may be part of an inertial measurement unit (IMU). In one embodiment, other position information that is used is longitude and latitude information obtained from a global positioning system (GPS). The motion information may be stored in memory in the satellite terminal that is accessible by the combiner/arbiter. Alternatively, the motion information is stored in a memory in the combiner/arbiter.

Based on the motion information, processing logic generates location prediction information for each of the antennas (processing block 326). The location prediction information is indicative of the expected position of each of the antennas during the expected transmission time. For example, if a data transmission is to occur within the next 30 seconds, processing logic evaluates the historical location information to make a prediction as to what the location/position of each antenna will be at that time. The amount of historical location information may depend on the prediction algorithm used. For example, in one embodiment, only the last 5 or 10 minutes, or some other short time interval, of historical data is used to make a prediction. In other embodiments, longer time intervals, such as a certain number of hours or days may be used.

In one embodiment, processing logic determines if any of the antennas will experience an outage when transmission time to the satellite is expected (processing block 327). This is optional. Such a determination would be based on the predicted motion information associated with the antennas.

Based on the receive signal quality of each of the antennas and based on predicted motion of each of the antennas, processing logic selects one of the antennas to transmit to the satellite of each of the antennas (processing block 328). In one embodiment, the receive signal quality information and the predicted motion information is accessed from memory and used to select the antenna to transmit. In one embodiment, selecting the one antenna is based on the one antenna having a higher signal quality than other antennas in the plurality of antennas if the predicted motion information indicated that all the antennas coupled transmit to the satellite. If the predicted motion information indicated that one or more of the antennas would have an outage and be unable to transmit to the satellite based on their position, then those antennas would be excluded from selection. Thus, in such a case, the determination of which, if any, of the antennas has an outage impacts their chances for selection to transmit to the satellite.

After selection, processing logic directs the transmit data from the data modem to the selected antenna and the selected antenna transmits the data to the satellite (processing block 329).

Figure 4:
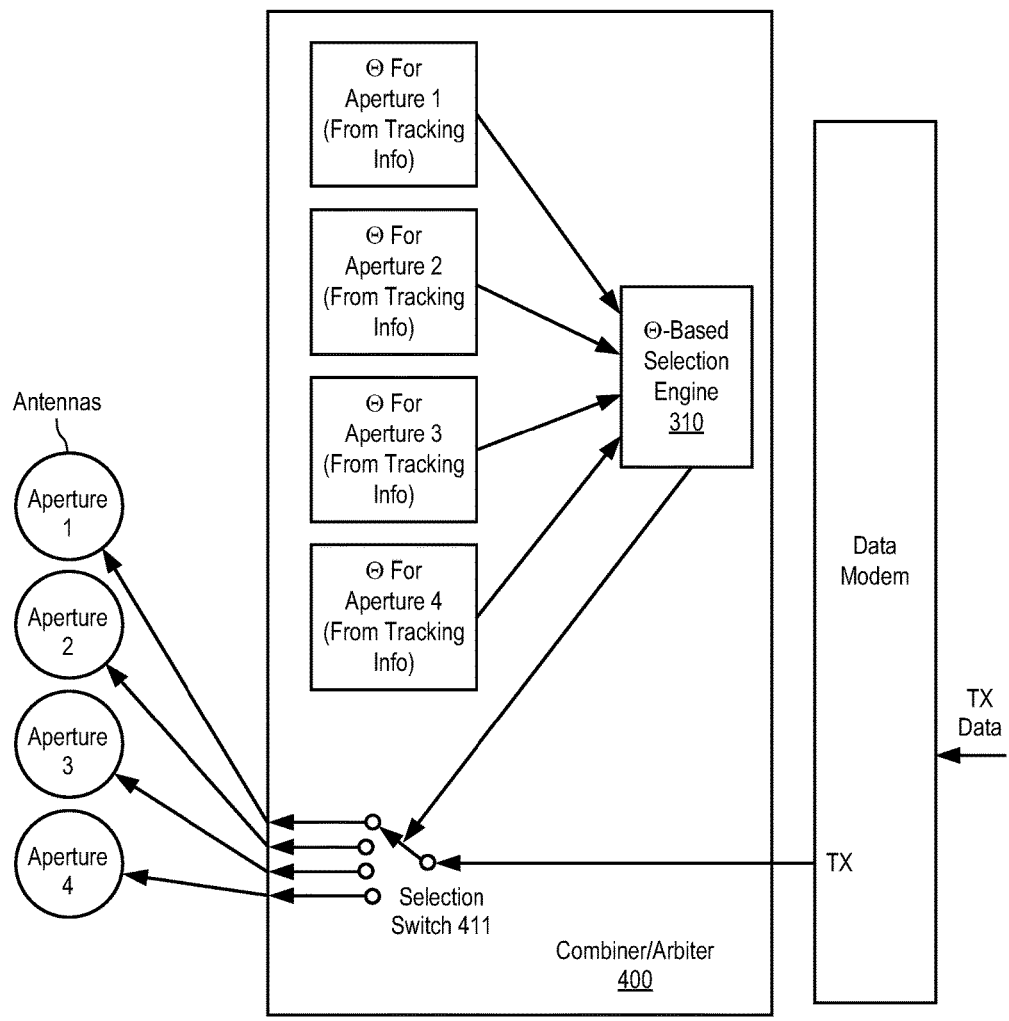
FIG. 4 illustrates an example of an elevation angle (θ)-based transmit antenna selection embodiment.

The selection of an antenna to transmit may be based on information other than signal quality. In one embodiment, the selection is based on θ information obtained from the tracking operation of the satellite. FIG. 4 illustrates an example of a θ-based transmit antenna selection embodiment. Referring to FIG. 4, θ-based selection engine 410 controls selection switch 411 based on the θ information obtained from each of the antennas. In one embodiment, selection switch 411 is an RF switch. This information may be obtained from the tracking subsystem of each antenna and stored in a memory within combiner/arbiter 400 or accessible by it. In one embodiment, power spectral density issues which would drive the transmit antenna selection based on theta.

Note that combiner/arbiter 400 includes the receive signal combining functionality, such as described in conjunction with FIG. 1A, but this has been removed from FIG. 4 to avoid obscuring the transmission selection functionality.

The combiner described herein enables satellite owners to scale the antenna receive efficiency to any level they desire. Before the combiner, maritime vessels (as an example) in some cases had to have a 2.4 meter gimbal dish antenna to get the receive gain the needed, which requires cranes to install, is expensive to buy and takes engineers days or week to install. With multiple flat panel antennas described herein connected to the combiner, the panel antennas together generate reception from satellite to desired specifications including the performance of traditional 2.4 m gimbal dish antennas.

Examples of Antenna Embodiments

The techniques described above may be used with flat panel antennas. Embodiments of such flat panel antennas are disclosed. The flat panel antennas include one or more arrays of antenna elements on an antenna aperture. In one embodiment, the antenna elements comprise liquid crystal cells. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Examples of Antenna Systems

In one embodiment, the flat panel antenna is part of a metamaterial antenna system. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology to form and steer transmit and receive beams through separate antennas. In one embodiment, the antenna systems are analog systems, in contrast to antenna systems that employ digital signal processing to electrically form and steer beams (such as phased array antennas).

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Examples of Wave Guiding Structures

Figure 5:
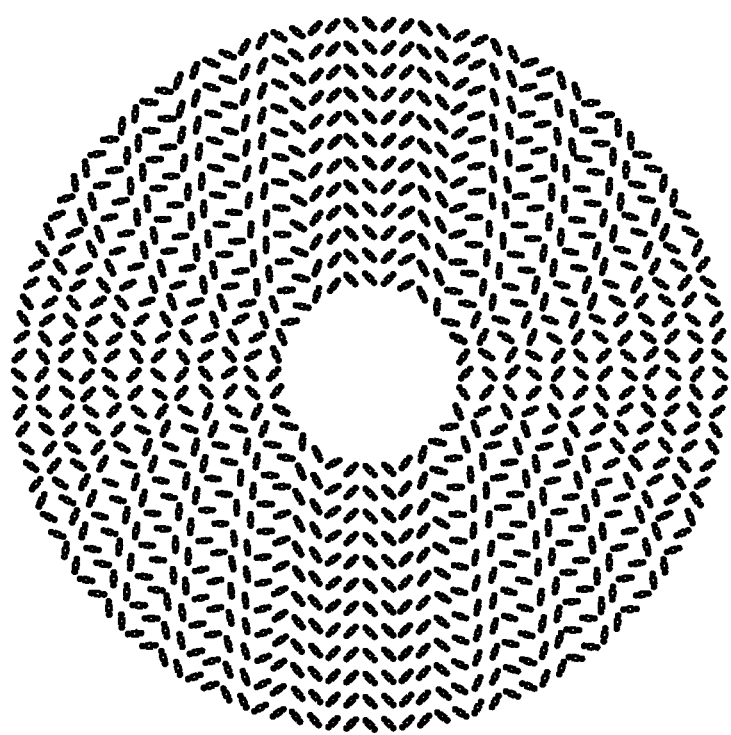
FIG. 5 illustrates an aperture having one or more arrays of antenna elements placed in concentric rings around an input feed of the cylindrically fed antenna.

FIG. 5 illustrates an aperture having one or more arrays of antenna elements placed in concentric rings around an input feed of the cylindrically fed antenna.

Note that the RF resonators described herein may be used in antennas that do not include a cylindrical feed. In one embodiment, the antenna includes a coaxial feed that is used to provide a cylindrical wave feed. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

Antenna Elements

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. As would be understood by those skilled in the art, LC in the context of CELC refers to inductance-capacitance, as opposed to liquid crystal.

In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In one embodiment, the feed geometry of this antenna system allows the antenna elements to be positioned at forty-five degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one embodiment, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In one embodiment, the control structure for the antenna system has 2 main components: the antenna array controller, which includes drive electronics, for the antenna system, is below the wave scattering structure, while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 6:
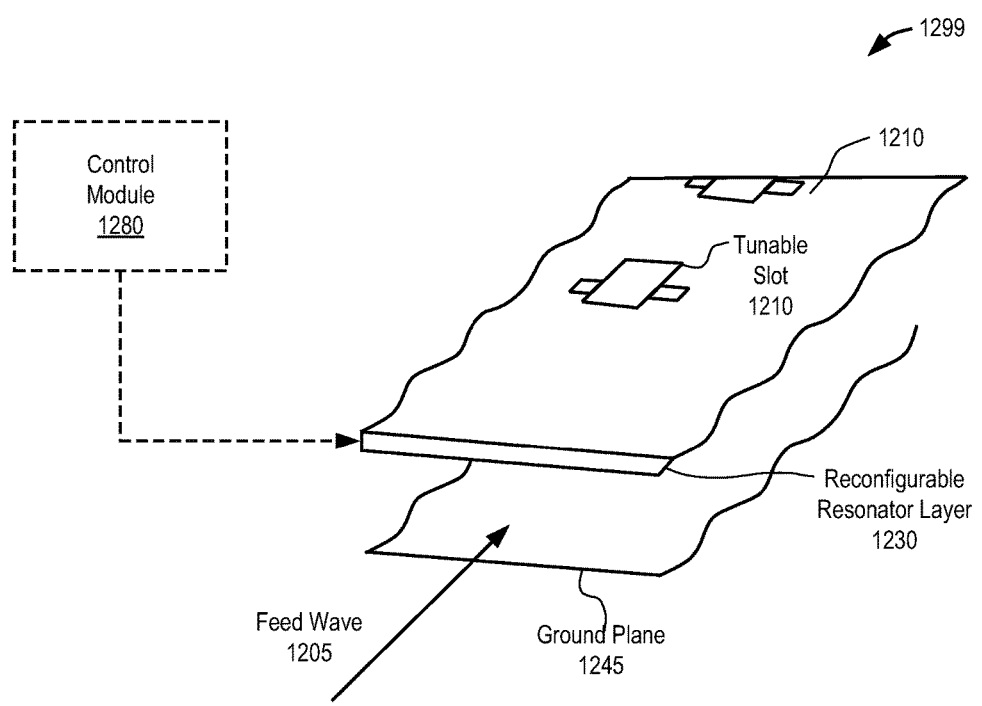
FIG. 6 illustrates a perspective view of one row of antenna elements that includes a ground plane and a reconfigurable resonator layer.

FIG. 6 illustrates a perspective view of one row of antenna elements that includes a ground plane and a reconfigurable resonator layer. Reconfigurable resonator layer 1230 includes an array of tunable slots 1210. The array of tunable slots 1210 can be configured to point the antenna in a desired direction. Each of the tunable slots can be tuned/adjusted by varying a voltage across the liquid crystal.

Control module 1280 is coupled to reconfigurable resonator layer 1230 to modulate the array of tunable slots 1210 by varying the voltage across the liquid crystal in FIG. 6. Control module 1280 may include a Field Programmable Gate Array ("FPGA"), a microprocessor, a controller, System-on-a-Chip (SoC), or other processing logic. In one embodiment, control module 1280 includes logic circuitry (e.g., multiplexer) to drive the array of tunable slots 1210. In one embodiment, control module 1280 receives data that includes specifications for a holographic diffraction pattern to be driven onto the array of tunable slots 1210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 1280 may drive each array of tunable slots described in the figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 1205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 1210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram} = w^*_{in} w_{out}$, with $w_{in}$ as the wave equation in the waveguide and $w_{out}$ the wave equation on the outgoing wave.

Figure 7:
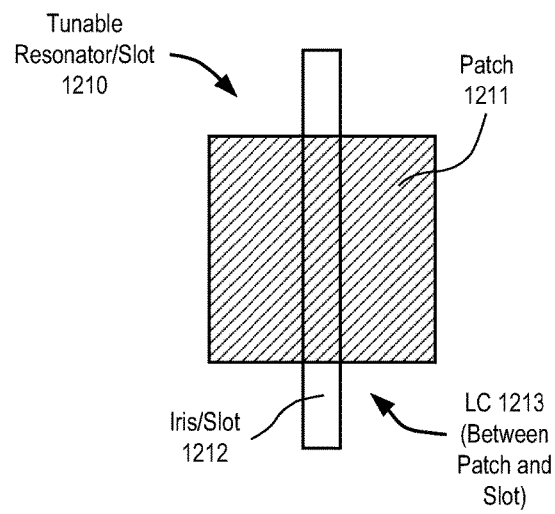
FIG. 7 illustrates one embodiment of a tunable resonator/slot.

FIG. 7 illustrates one embodiment of a tunable resonator/slot 1210. Tunable slot 1210 includes an iris/slot 1212, a radiating patch 1211, and liquid crystal 1213 disposed between iris 1212 and patch 1211. In one embodiment, radiating patch 1211 is co-located with iris 1212.

Figure 8:
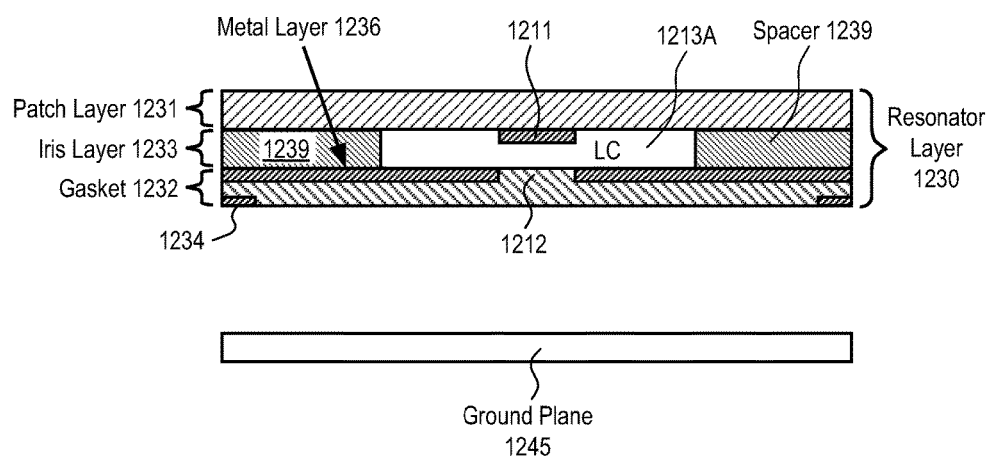
FIG. 8 illustrates a cross section view of one embodiment of a physical antenna aperture.

FIG. 8 illustrates a cross section view of one embodiment of a physical antenna aperture. The antenna aperture includes ground plane 1245, and a metal layer 1236 within iris layer 1233, which is included in reconfigurable resonator layer 1230. In one embodiment, the antenna aperture of FIG. 8 includes a plurality of tunable resonator/slots 1210 of FIG. 7. Iris/slot 1212 is defined by openings in metal layer 1236. A feed wave, such as feed wave 1205 of FIG. 6, may have a microwave frequency compatible with satellite communication channels. The feed wave propagates between ground plane 1245 and resonator layer 1230.

Reconfigurable resonator layer 1230 also includes gasket layer 1232 and patch layer 1231. Gasket layer 1232 is disposed below patch layer 1231 and iris layer 1233. Note that in one embodiment, a spacer could replace gasket layer 1232. In one embodiment, iris layer 1233 is a printed circuit board ("PCB") that includes a copper layer as metal layer 1236. In one embodiment, iris layer 1233 is glass. Iris layer 1233 may be other types of substrates.

Openings may be etched in the copper layer to form slots 1212. In one embodiment, iris layer 1233 is conductively coupled by a conductive bonding layer to another structure (e.g., a waveguide) in FIG. 8. Note that in an embodiment the iris layer is not conductively coupled by a conductive bonding layer and is instead interfaced with a non-conducting bonding layer.

Patch layer 1231 may also be a PCB that includes metal as radiating patches 1211. In one embodiment, gasket layer 1232 includes spacers 1239 that provide a mechanical standoff to define the dimension between metal layer 1236 and patch 1211. In one embodiment, the spacers are 75 microns, but other sizes may be used (e.g., 3-200 mm). As mentioned above, in one embodiment, the antenna aperture of FIG. 8 includes multiple tunable resonator/slots, such as tunable resonator/slot 1210 includes patch 1211, liquid crystal 1213, and iris 1212 of FIG. 7. The chamber for liquid crystal 1213 is defined by spacers 1239, iris layer 1233 and metal layer 1236. When the chamber is filled with liquid crystal, patch layer 1231 can be laminated onto spacers 1239 to seal liquid crystal within resonator layer 1230.

A voltage between patch layer 1231 and iris layer 1233 can be modulated to tune the liquid crystal in the gap between the patch and the slots (e.g., tunable resonator/slot 1210). Adjusting the voltage across liquid crystal 1213 varies the capacitance of a slot (e.g., tunable resonator/slot 1210). Accordingly, the reactance of a slot (e.g., tunable resonator/slot 1210) can be varied by changing the capacitance. Resonant frequency of slot 1210 also changes according to the equation $$f = \frac{1}{2\pi\sqrt{LC}}$$

where f is the resonant frequency of slot 1210 and L and C are the inductance and capacitance of slot 1210, respectively. The resonant frequency of slot 1210 affects the energy radiated from feed wave 1205 propagating through the waveguide. As an example, if feed wave 1205 is 20 GHz, the resonant frequency of a slot 1210 may be adjusted (by varying the capacitance) to 17 GHz so that the slot 1210 couples substantially no energy from feed wave 1205. Or, the resonant frequency of a slot 1210 may be adjusted to 20 GHz so that the slot 1210 couples energy from feed wave 1205 and radiates that energy into free space. Although the examples given are binary (fully radiating or not radiating at all), full gray scale control of the reactance, and therefore the resonant frequency of slot 1210 is possible with voltage variance over a multi-valued range. Hence, the energy radiated from each slot 1210 can be finely controlled so that detailed holographic diffraction patterns can be formed by the array of tunable slots.

In one embodiment, tunable slots in a row are spaced from each other by $\lambda/5$. Other spacings may be used. In one embodiment, each tunable slot in a row is spaced from the closest tunable slot in an adjacent row by $\lambda/2$, and, thus, commonly oriented tunable slots in different rows are spaced by $\lambda/4$, though other spacings are possible (e.g., $\lambda/5$, $\lambda/6.3$). In another embodiment, each tunable slot in a row is spaced from the closest tunable slot in an adjacent row by $\lambda/3$.

Embodiments use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014 and U.S. patent application Ser. No. 14/610,502, entitled "Ridged Waveguide Feed Structures for Reconfigurable Antenna", filed Jan. 30, 2015.

FIGS. 9A-D illustrate one embodiment of the different layers for creating the slotted array. The antenna array includes antenna elements that are positioned in rings, such as the example rings shown in FIG. 5. Note that in this example the antenna array has two different types of antenna elements that are used for two different types of frequency bands.

Figures 9A, 9B:
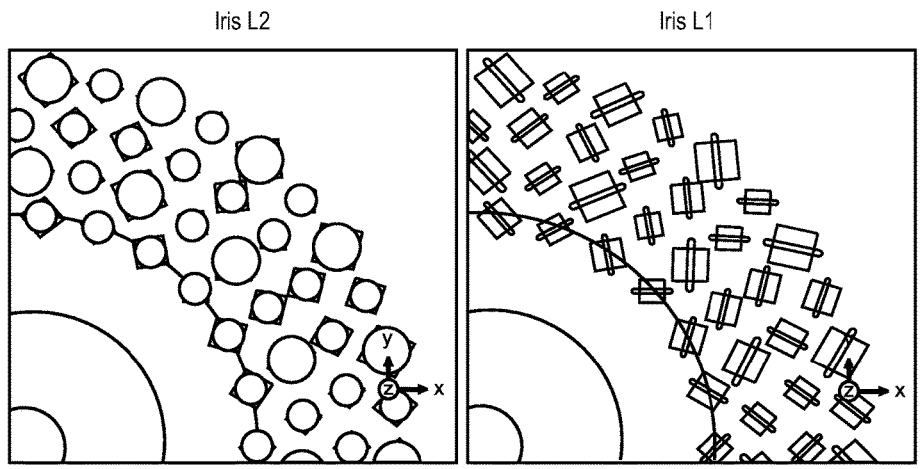
FIGS. 9A-D illustrate one embodiment of the different layers for creating the slotted array.
Figures 9C, 9D:
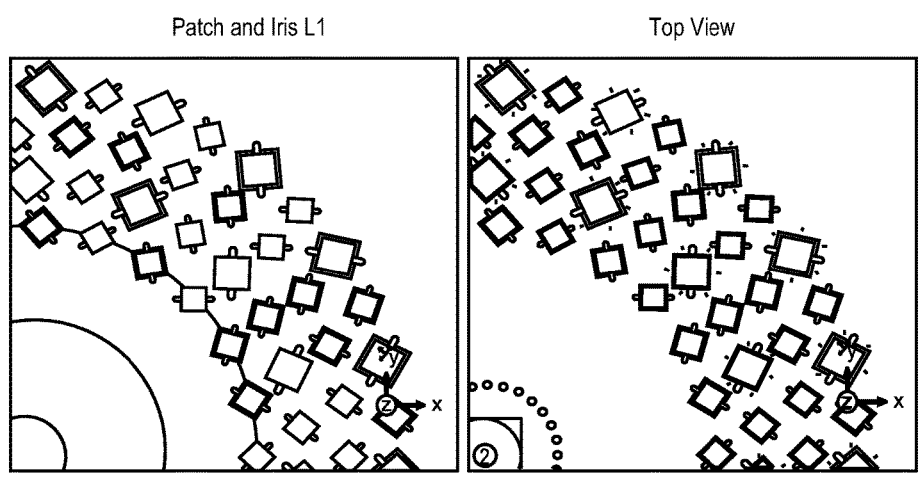

FIG. 9A illustrates a portion of the first iris board layer with locations corresponding to the slots. Referring to FIG. 9A, the circles are open areas/slots in the metallization in the bottom side of the iris substrate, and are for controlling the coupling of elements to the feed (the feed wave). Note that this layer is an optional layer and is not used in all designs. FIG. 9B illustrates a portion of the second iris board layer containing slots. FIG. 9C illustrates patches over a portion of the second iris board layer. FIG. 9D illustrates a top view of a portion of the slotted array.

Figure 10:
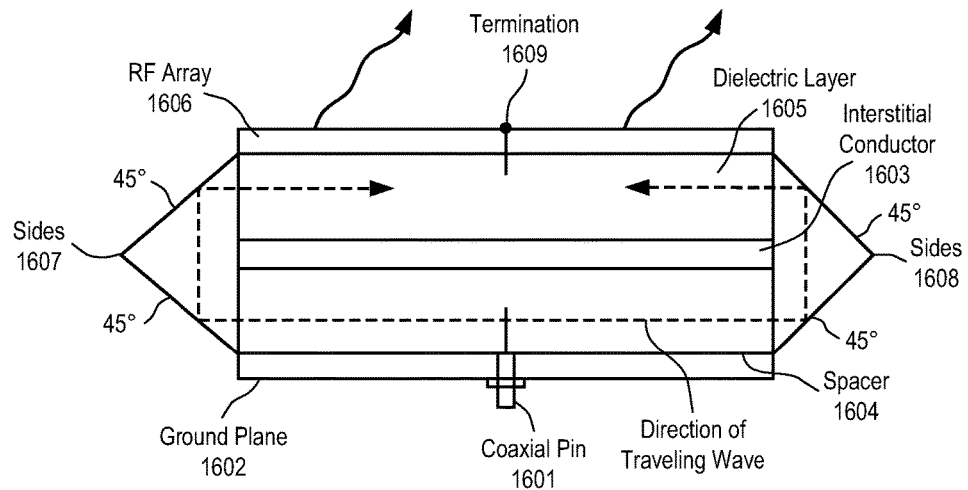
FIG. 10 illustrates a side view of one embodiment of a cylindrically fed antenna structure.

FIG. 10 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 10 includes a coaxial feed, such as, for example, described in U.S. Publication No. 2015/0236412, entitled "Dynamic Polarization and Coupling Control from a Steerable Cylindrically Fed Holographic Antenna", filed on Nov. 21, 2014.

Referring to FIG. 10, a coaxial pin 1601 is used to excite the field on the lower level of the antenna. In one embodiment, coaxial pin 1601 is a 50Ω coax pin that is readily available. Coaxial pin 1601 is coupled (e.g., bolted) to the bottom of the antenna structure, which is conducting ground plane 1602.

Separate from conducting ground plane 1602 is interstitial conductor 1603, which is an internal conductor. In one embodiment, conducting ground plane 1602 and interstitial conductor 1603 are parallel to each other. In one embodiment, the distance between ground plane 1602 and interstitial conductor 1603 is 0.1-0.15". In another embodiment, this distance may be λ/2, where λ is the wavelength of the travelling wave at the frequency of operation.

Ground plane 1602 is separated from interstitial conductor 1603 via a spacer 1604. In one embodiment, spacer 1604 is a foam or air-like spacer. In one embodiment, spacer 1604 comprises a plastic spacer.

On top of interstitial conductor 1603 is dielectric layer 1605. In one embodiment, dielectric layer 1605 is plastic. The purpose of dielectric layer 1605 is to slow the travelling wave relative to free space velocity. In one embodiment, dielectric layer 1605 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1605, such as periodic sub-wavelength metallic structures that can be machined or lithographically defined, for example.

An RF-array 1606 is on top of dielectric 1605. In one embodiment, the distance between interstitial conductor 1603 and RF-array 1606 is 0.1-0.15". In another embodiment, this distance may be $\lambda_{eff}/2$, where $\lambda_{eff}$ is the effective wavelength in the medium at the design frequency.

The antenna includes sides 1607 and 1608. Sides 1607 and 1608 are angled to cause a travelling wave feed from coax pin 1601 to be propagated from the area below interstitial conductor 1603 (the spacer layer) to the area above interstitial conductor 1603 (the dielectric layer) via reflection. In one embodiment, the angle of sides 1607 and 1608 are at 45° angles. In an alternative embodiment, sides 1607 and 1608 could be replaced with a continuous radius to achieve the reflection. While FIG. 10 shows angled sides that have angle of 45 degrees, other angles that accomplish signal transmission from lower level feed to upper level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 1601, the wave travels outward concentrically oriented from coaxial pin 1601 in the area between ground plane 1602 and interstitial conductor 1603. The concentrically outgoing waves are reflected by sides 1607 and 1608 and travel inwardly in the area between interstitial conductor 1603 and RF array 1606. The reflection from the edge of the circular perimeter causes the wave to remain in phase (i.e., it is an in-phase reflection). The travelling wave is slowed by dielectric layer 1605. At this point, the travelling wave starts interacting and exciting with elements in RF array 1606 to obtain the desired scattering.

To terminate the travelling wave, a termination 1609 is included in the antenna at the geometric center of the antenna. In one embodiment, termination 1609 comprises a pin termination (e.g., a 50Ω pin). In another embodiment, termination 1609 comprises an RF absorber that terminates unused energy to prevent reflections of that unused energy back through the feed structure of the antenna. These could be used at the top of RF array 1606.

Figure 11:
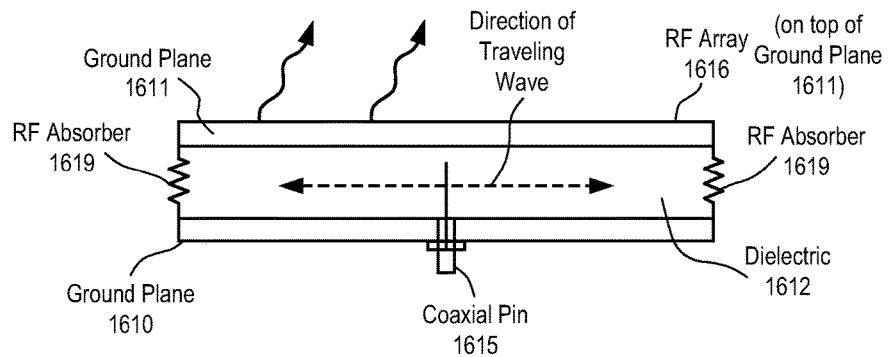
FIG. 11 illustrates another embodiment of the antenna system with an outgoing wave.

FIG. 11 illustrates another embodiment of the antenna system with an outgoing wave. Referring to FIG. 11, two ground planes 1610 and 1611 are substantially parallel to each other with a dielectric layer 1612 (e.g., a plastic layer, etc.) in between ground planes. RF absorbers 1619 (e.g., resistors) couple the two ground planes 1610 and 1611 together. A coaxial pin 1615 (e.g., 5052) feeds the antenna. An RF array 1616 is on top of dielectric layer 1612 and ground plane 1611.

In operation, a feed wave is fed through coaxial pin 1615 and travels concentrically outward and interacts with the elements of RF array 1616.

The cylindrical feed in both the antennas of FIGS. 10 and 11 improves the service angle of the antenna. Instead of a service angle of plus or minus forty-five degrees azimuth (±45° Az) and plus or minus twenty-five degrees elevation (±25° El), in one embodiment, the antenna system has a service angle of seventy five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1606 of FIG. 10 and RF array 1616 of FIG. 11 include a wave scattering subsystem that includes a group of patch antennas (i.e., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty-five degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Cell Placement

Figure 12:
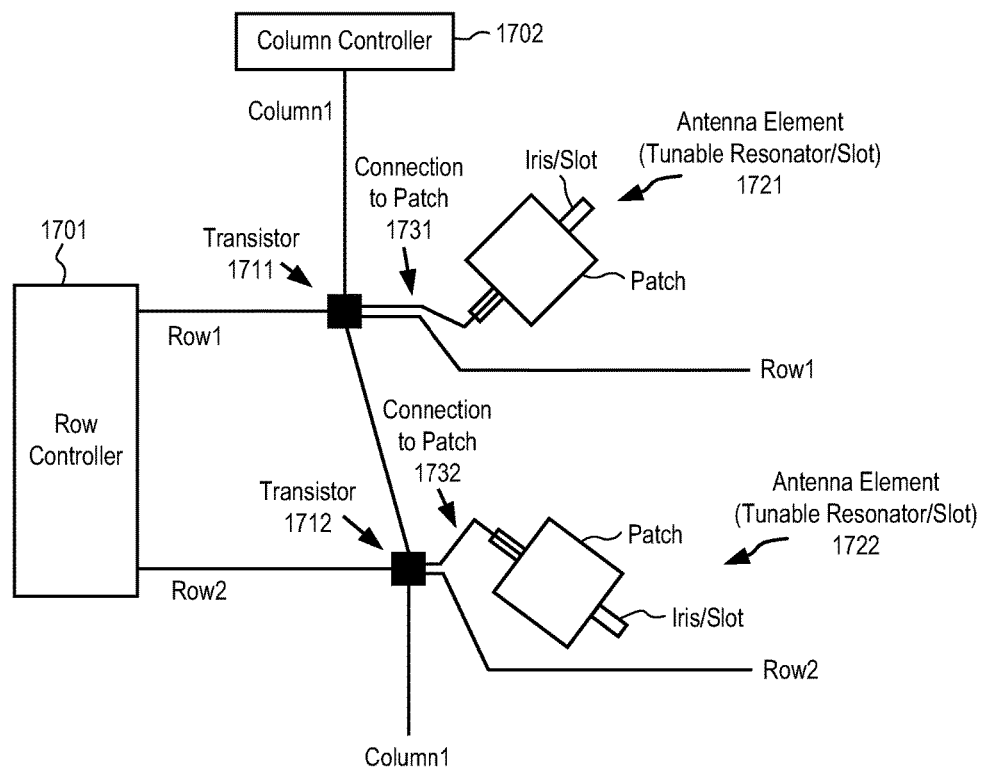
FIG. 12 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 12 illustrates one embodiment of the placement of matrix drive circuitry with respect to antenna elements. Referring to FIG. 12, row controller 1701 is coupled to transistors 1711 and 1712, via row select signals Row1 and Row2, respectively, and column controller 1702 is coupled to transistors 1711 and 1712 via column select signal Column1. Transistor 1711 is also coupled to antenna element 1721 via connection to patch 1731, while transistor 1712 is coupled to antenna element 1722 via connection to patch 1732.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is predefined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 13:
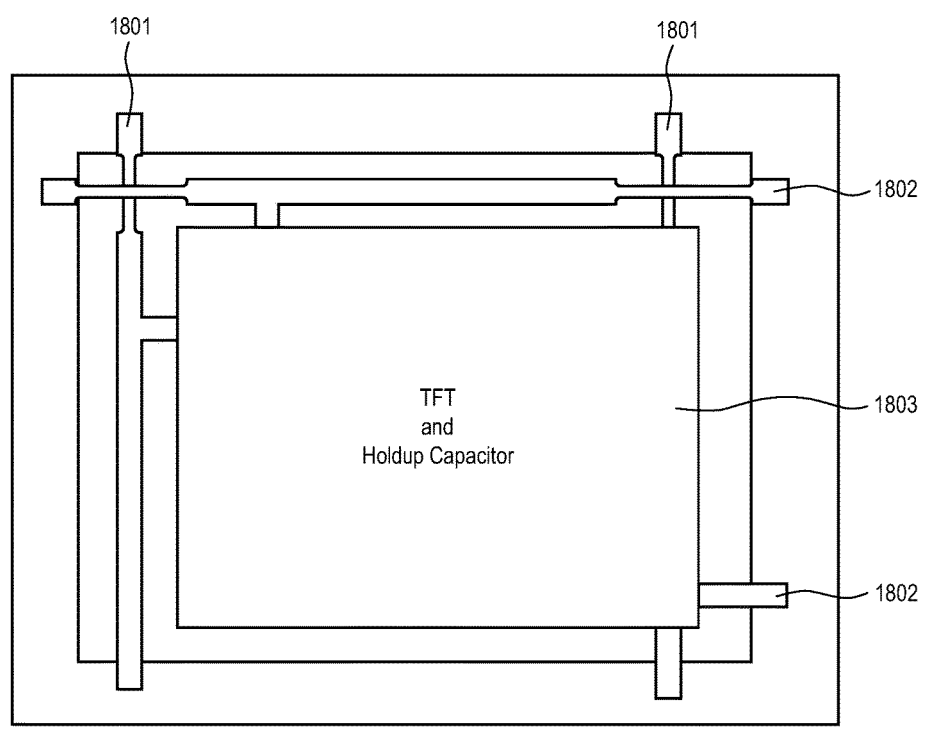
FIG. 13 illustrates one embodiment of a TFT package.

In one embodiment, a TFT package is used to enable placement and unique addressing in the matrix drive. FIG. 13 illustrates one embodiment of a TFT package. Referring to FIG. 13, a TFT and a hold capacitor 1803 is shown with input and output ports. There are two input ports connected to traces 1801 and two output ports connected to traces 1802 to connect the TFTs together using the rows and columns. In one embodiment, the row and column traces cross in 90° angles to reduce, and potentially minimize, the coupling between the row and column traces. In one embodiment, the row and column traces are on different layers.

An Example of a Full Duplex Communication System

Figure 14:
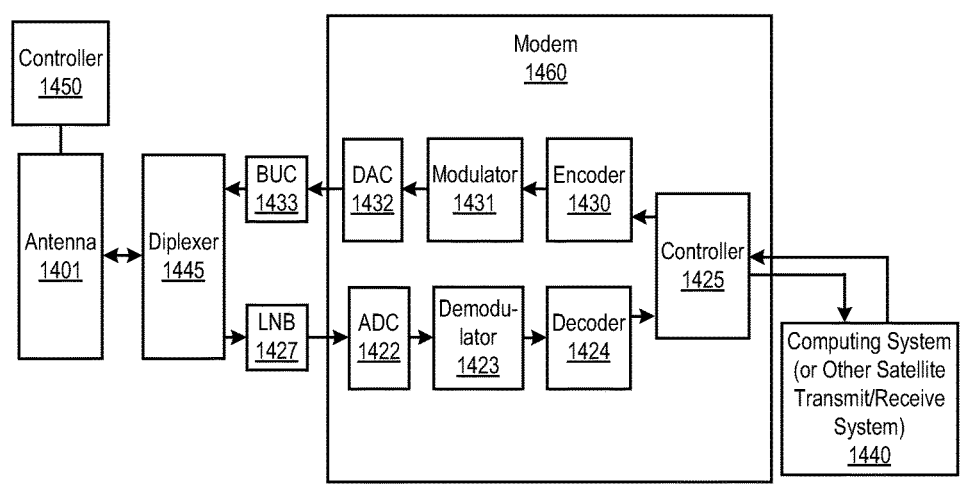
FIG. 14 is a block diagram of another embodiment of a communication system having simultaneous transmit and receive paths.

In another embodiment, the combined antenna apertures are used in a full duplex communication system. FIG. 14 is a block diagram of another embodiment of a communication system having simultaneous transmit and receive paths. While only one transmit path and one receive path are shown, the communication system may include more than one transmit path and/or more than one receive path.

Referring to FIG. 14, antenna 1401 includes two spatially interleaved antenna arrays operable independently to transmit and receive simultaneously at different frequencies as described above. In one embodiment, antenna 1401 is coupled to diplexer 1445. The coupling may be by one or more feeding networks. In one embodiment, in the case of a radial feed antenna, diplexer 1445 combines the two signals and the connection between antenna 1401 and diplexer 1445 is a single broad-band feeding network that can carry both frequencies.

Diplexer 1445 is coupled to a low noise block down converter (LNBs) 1427, which performs a noise filtering function and a down conversion and amplification function in a manner well-known in the art. In one embodiment, LNB 1427 is in an out-door unit (ODU). In another embodiment, LNB 1427 is integrated into the antenna apparatus. LNB 1427 is coupled to a modem 1460, which is coupled to computing system 1440 (e.g., a computer system, modem, etc.).

Modem 1460 includes an analog-to-digital converter (ADC) 1422, which is coupled to LNB 1427, to convert the received signal output from diplexer 1445 into digital format. Once converted to digital format, the signal is demodulated by demodulator 1423 and decoded by decoder 1424 to obtain the encoded data on the received wave. The decoded data is then sent to controller 1425, which sends it to computing system 1440.

Modem 1460 also includes an encoder 1430 that encodes data to be transmitted from computing system 1440. The encoded data is modulated by modulator 1431 and then converted to analog by digital-to-analog converter (DAC) 1432. The analog signal is then filtered by a BUC (upconvert and high pass amplifier) 1433 and provided to one port of diplexer 1445. In one embodiment, BUC 1433 is in an out-door unit (ODU).

Diplexer 1445 operating in a manner well-known in the art provides the transmit signal to antenna 1401 for transmission.

Controller 1450 controls antenna 1401, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 14 has a number of applications, including but not limited to, internet communication, vehicle communication (including software updating), etc.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
   a plurality of antennas, coupled to a moving platform, to receive signals from a satellite, each antenna in the plurality of antennas having a transmit aperture and a receive aperture, and wherein the receive aperture is operable to receive one of the signals from the satellite, wherein the plurality of antennas comprises a plurality of electronically-steerable flat panel antennas;
   a plurality of signal analyzers coupled to the plurality of antennas, each signal analyzer operable to determine signal quality of a distinct one antenna of the plurality of antennas;
   a prediction engine to generate predicted motion information indicative of a predicted location of each of the plurality of antennas for an expected time of satellite transmission based on motion information obtained from one or more sensors coupled to the plurality of antennas and expected transmission time;
   an arbiter coupled to the plurality of signal analyzers and the prediction engine and operable to select one antenna of the plurality of antennas to transmit to the satellite based on results of determining the signal quality and the predicted location of each antenna of the plurality of antennas coupled to the moving platform;
   a first selector coupled to the arbiter and the plurality of antennas to cause data to be sent to the one antenna selected for transmission to the satellite; and a combiner coupled to the plurality of antennas to combine the signals received by the plurality of antennas into one signal, wherein the combiner is operable to coherently sum signals received by the plurality of antennas while the one antenna transmits to the satellite.

2. The apparatus defined in claim 1 wherein signals received by the plurality of antennas from the satellite are correlated.

3. The apparatus defined in claim 1 wherein the combiner is operable to combine the signals by coherently summing the signals using Maximal Ratio combining, equal gain combining, switched combining, or selection combining.

4. The apparatus defined in claim 1 further comprising:
a second selector operable to select a second antenna of the plurality of antenna to transmit data to the satellite in addition to the one antenna and send data to the satellite for transmission using the second antenna simultaneously with transmission to the satellite by the one antenna.

5. The apparatus defined in claim 1 wherein the first selector is operable to select the one antenna based on the one antenna having a higher signal quality than other antennas in the plurality of antennas.

6. The apparatus defined in claim 1 wherein the first selector is operable to determine antenna outages of each of the plurality of antennas based on the predicted motion and is operable to select the one antenna based on the determined antenna outages.

7. The apparatus defined in claim 1 wherein each of the plurality of electronically-steerable flat panel antennas having at least two spatially interleaved antenna arrays combined in a single physical aperture operable independently and simultaneously at distinct frequencies, wherein each of the at least two antenna sub-arrays comprises a tunable slotted array of antenna elements.

8. The apparatus defined in claim 1 wherein at least one of the transmit aperture and the receive aperture operates based on holographic beam forming.

9. The apparatus defined in claim 1 wherein the transmit aperture and the receive aperture of each antenna of the plurality of antennas comprises a tunable slotted array of antenna elements combined into a single physical aperture.

10. The apparatus defined in claim 9 wherein antenna elements of the transmit aperture and antenna elements of the receive aperture are interleaved and spaced with respect to each other.

11. The apparatus defined in claim 9 wherein each slotted array comprises a plurality of slots and further wherein each slot is tuned to provide a desired scattering at a given frequency.

12. The apparatus defined in claim 9 wherein each slotted array comprises:
a plurality of slots;
a plurality of patches, wherein each of the patches is co-located over and separated from a slot in the plurality of slots, forming a patch/slot pair, each patch/slot pair being turned off or on based on application of a voltage to the patch in the pair; and
a controller to apply a control pattern to control which patch/slot pairs are on and off to cause generation of a beam.

13. A method comprising:
receiving signals from a satellite using a plurality of antennas coupled to a moving platform, each antenna in the plurality of antennas having a transmit aperture and a receive aperture, wherein the plurality of antennas comprises a plurality of electronically-steerable flat panel antennas;
generating predicted motion information indicative of a predicted location of each of the plurality of antennas for an expected time of satellite transmission based on motion information obtained from one or more sensors coupled to the plurality of antennas and based on expected transmission time;
combining the signals received by the plurality of antennas into one signal using a combiner;
analyzing signal quality for each of the signals received by each of the plurality of antennas;
selecting one of the plurality of antennas to transmit to the satellite based on results of analyzing the signal quality and the predicted location of each antenna of the plurality of antennas coupled to the moving platform; and
transmitting data to the satellite using the one antenna while the combiner coherently sums signals received by the plurality of antennas.

14. The method defined in claim 13 wherein the signals from the satellite received by each antenna are correlated.

15. The method defined in claim 13 wherein combining the signals comprises coherently summing the signals using Maximal Ratio combining, equal gain combining, switched combining, or selection combining.

16. The method defined in claim 13 further comprising:
selecting a second antenna of the plurality of antenna to transmit data to the satellite in addition to the one antenna; and
transmitting data to the satellite using the second antenna simultaneously with transmission to the satellite by the one antenna.

17. The method defined in claim 13 wherein selecting the one antenna is based on the one antenna having a higher signal quality than other antennas in the plurality of antennas.

18. The method defined in claim 13 further comprising determining antenna outages of each of the plurality of antennas based on the predicted motion, and wherein selecting the one antenna is based on the determined antenna outages.

19. The method defined in claim 13 wherein each of the plurality of electronically-steerable flat panel antennas having at least two spatially interleaved antenna arrays combined in a single physical aperture operable independently and simultaneously at distinct frequencies, wherein each of the at least two antenna sub-arrays comprises a tunable slotted array of antenna elements.

20. The method defined in claim 13 wherein at least one of the transmit aperture and the receive aperture operates based on holographic beam forming.

21. An apparatus comprising:
a memory operable to store receive signal quality information for each of a plurality of antennas, wherein the plurality of antennas comprises a plurality of electronically-steerable flat panel antennas coupled to a moving platform;
a prediction engine to generate predicted motion information indicative of a predicted location of each of the plurality of antennas for an expected time of satellite transmission based on motion information obtained from one or more sensors coupled to the plurality of antennas and expected transmission time;
an arbiter coupled to the memory and the prediction engine and operable to select one antenna of the plurality of antennas to transmit to the satellite based on results of determining the signal quality and the predicted location of each antenna of the plurality of antennas coupled to the moving platform; and a first selector coupled to the arbiter to cause data to be sent to the one antenna selected for transmission to the satellite; and a combiner coupled to the plurality of antennas to combine the signals received by the plurality of antennas into one signal, wherein the combiner is operable to coherently sum signals received by the plurality of antennas while the one antenna transmits to the satellite.

22. The apparatus defined in claim 21 wherein the combiner is operable to combine the signals by coherently summing the signals using Maximal Ratio combining, equal gain combining, switched combining, or selection combining.

23. The apparatus defined in claim 21 wherein the first selector is operable to select the one antenna based on the one antenna having a higher signal quality than other antennas in the plurality of antennas.

24. The apparatus defined in claim 23 wherein the first selector is operable to select the one antenna of the plurality of antenna based on predicted motion of each antenna of the plurality of antennas.

* * * * *